US011457613B2

(12) United States Patent
Huisma (10) Patent No.: US 11,457,613 B2
(45) Date of Patent: Oct. 4, 2022

(54) SYSTEM FOR MEASURING, MONITORING AND MANAGING FEED INTAKE TO DETERMINE FEED EFFICIENCY OF INDIVIDUAL ANIMALS OF A DIARY HERD (71) Applicant: GROWSAFE SYSTEMS LTD., Calgary (CA)

(72) Inventor: Camiel Huisma, Airdrie (CA)

(73) Assignee: GROWSAFE SYSTEMS LTD., Airdrie (CA)

( * ) Notice: Subject to any disclaimer, the term of this patent is extended or adjusted under 35 U.S.C. 154(b) by 65 days.

(21) Appl. No.: 16/650,563

(22) PCT Filed: Sep. 26, 2018

(86) PCT No.: PCT/IB2018/001094
§ 371 (c)(1),
(2) Date: Mar. 25, 2020

(87) PCT Pub. No.: WO2019/064060
PCT Pub. Date: Apr. 4, 2019

(65) Prior Publication Data
US 2020/0323172 A1    Oct. 15, 2020

Related U.S. Application Data (60) Provisional application No. 62/563,211, filed on Sep. 26, 2017.

(51) Int. Cl.
*A01K 5/02* (2006.01)
*G01G 19/414* (2006.01)
(Continued)

(52) U.S. Cl.
CPC ............. *A01K 29/005* (2013.01); *A01K 1/10* (2013.01); *A01K 1/105* (2013.01); *A01K 5/01* (2013.01);
(Continued)

(58) Field of Classification Search
CPC ........ A01K 29/005; A01K 1/105; A01K 1/10; A01K 5/01
See application file for complete search history.

(56) References Cited

U.S. PATENT DOCUMENTS 3,362,552 A * 1/1968 Thiele ................... B60P 1/6427
414/469
2002/0152966 A1    10/2002 Lely et al.
(Continued)

FOREIGN PATENT DOCUMENTS

FR      2998448 A1 *  5/2014 ........... A01K 1/0606
WO   WO-2012078680 A1 *  6/2012 ............... A01K 5/02

OTHER PUBLICATIONS

Machine Translation of FR2998448, 2014.*
(Continued)

*Primary Examiner* — Joshua D Huson
*Assistant Examiner* — Katherine Anne Kloecker
(74) *Attorney, Agent, or Firm* — McKee, Voorhees & Sease, PLC (57) ABSTRACT

A feeding system for measuring, monitoring and managing feed intake to determine feed efficiency of individual animals of a dairy herd. The feeding system includes at least one feed trough that contains feed to be consumed by the individual animals of the dairy herd. At least one load cell is coupled to the at least one feed trough for detecting a weight of the feed contained within the at least one feed trough. Lifting assemblies support the at least one load cell. The lifting assemblies can be actuated to move the at least one load cell and the at least one feed trough between a set feeding position, in which the individual animals consume the amount of feed contained within the feed trough, and a pivoted discharge position in which the amount of feed is discharged from the feed trough.

6 Claims, 9 Drawing Sheets

(51) Int. Cl.
  *G01G 19/52*  (2006.01)
  *A01K 5/01*  (2006.01)
  *A01K 29/00*  (2006.01)
  *A01K 1/10*  (2006.01)

(52) U.S. Cl.
  CPC ........... *A01K 5/02* (2013.01); *G01G 19/4146* (2013.01); *G01G 19/52* (2013.01)

(56) References Cited

U.S. PATENT DOCUMENTS

| | | | |
|---|---|---|---|
| 2007/0181069 A1* | 8/2007 | Jack | A01K 5/01 119/61.1 |
| 2010/0018467 A1* | 1/2010 | Massicotte | A01K 5/0275 119/57.7 |
| 2010/0162960 A1* | 7/2010 | Moon | A01K 5/02 119/51.02 |
| 2017/0013802 A1* | 1/2017 | Zimmerman | G06K 7/10009 |

OTHER PUBLICATIONS

International Search Report Corresponding to PCT/IB2018/001094 dated Feb. 21, 2019.
Written Opinion Corresponding to PCT/IB2018/001094 dated Feb. 21, 2019.

* cited by examiner

SYSTEM FOR MEASURING, MONITORING AND MANAGING FEED INTAKE TO DETERMINE FEED EFFICIENCY OF INDIVIDUAL ANIMALS OF A DIARY HERD

FIELD OF THE INVENTION

The present invention relates to a system for measuring, monitoring and managing feed intake to determine feed efficiency of individual animals of a dairy herd.

BACKGROUND OF THE INVENTION

In the dairy industry the effectiveness of cows in producing milk is sometimes referred to as dairy efficiency or feed efficiency. Dairy efficiency can be defined simply as a ratio of the weight of milk produced to the weight dry matter or "feed" consumed. Monitoring dairy efficiency in the dairy industry has not been used as a common benchmark for monitoring profitability and evaluating dry matter intake relative to milk yield.

As prices of milk fluctuate, one way to maintain profitability without sacrificing milk production or herd health is by enhancing feed efficiency. There are many benefits associated with a herd of cattle that have high feed efficiencies. Not only is there a lower feed intake this also correlates to lower excretion as manure; an important factor as manure regulations for whole-farm management are enforced by local, state and national governments. The measurement of actual feed intake is critical for the determination an accurate dairy efficiency value. Attempts have been made in the dairy industry to weigh and monitor the feed intake of individual dairy cows so as to determine their dairy efficiency. However, known methods for feeding dairy cows produce too much "noise" in the data thus leading to inaccurate feed efficiency determinations.

It is also known in the dairy industry that there is a direct correlation between the quality and quantity of food consumed by the cattle and the quality and quantity of the milk produced. Dairy herds are commonly segregated into a number of different groups based on variety of factors such as the age of the cow, whether the cow is "dry," i.e., nonlactating or lactating, pregnant, as well as according to the current phase of the lactation cycle the cow is in. Dairy cattle can consume up to 50-80 pounds of feed/day (chopped up hay, grains, minerals and other supplements). Since feed for dairy cattle is so expensive, dairy producers generally supply lactating cattle that have a high milk output with large quantities of the freshest feed in an attempt to maximize milk production with the highest quality of milk possible.

Dairy farmers often utilize locking headgates for feeding the lactating cows. Locking headgates are set up along the length of feed bunks so as to retain the cattle at the feed bunk as long as possible. Spending a longer amount of time at the feed bunk, the cattle will generally consume a larger quantity of feed. In current practice, fresh feed is delivered to the feed bunk at least once a day, typically in the morning, by a feed truck that dispenses the feed in a line on the surface of the feed bunk adjacent the headgates. Over the course of the day, the cattle will approach the locking headgates and consume the feed. After a period of time on the feed bunk, the feed can start to become stale and less desirable. In an attempt to entice the lactating cattle to consume more feed, the leftover feed is arranged in piles on the feed bunk in front of the locking headgates thereby making feed easier to consume. Other strategies' dairy producers have to get the cattle to eat more feed is to add fresh feed on top of the leftover feed, i.e., the feed that was placed on the feed bunk earlier in the day and is now less appealing to the cattle. At the end of the day, it is typical for the leftover feed to be scooped up and removed from the feed bunk. The leftover feed is generally supplied to those groups of cattle that, at the time, are not lactating. Although this feeding strategy may be beneficial in supplying the best, freshest feed to the highest milk producing cattle at the time, the dairy farmer is unable to determine the feed efficiency of the cows.

SUMMARY OF THE INVENTION

Wherefore, it is an object of the present invention to overcome the above-mentioned shortcomings and drawbacks associated with the prior art.

The present invention relates to a feeding system which can be utilized with the system and method for determining animal behavioral phenotypes as described in U.S. 62/468,634, the description thereof being fully incorporated herein by reference thereto. The feeding system according to the present invention includes weighing devices for measuring the weight of the feed in the feed trough. The weight measurements are transmitted to a computer which records and analyses the collected data. From the collected and analyzed data over a period of time, the computer can then determine and monitor an animal's weight and gain, growth rate and the weight of feed/water consumed, e.g., feed/water intake by the animal over a period of time. Ultimately the weight data can be used to determine, among others, the residual feed intake and the feed/water retention of an animal.

Until now the high frequency collection of a variety of associated data and measurements is fundamental to the process of accurately defining animal behavioral phenotypes has been incorporated into feeding systems generally associated with beef production. Such systems for the high frequency collection of data and measurements have not been incorporated into feeding systems specifically associated with the dairy production.

As noted above, the more data collected over time, the better and more accurate the results. As such, a primary objective of the invention is the substantially continuous collection of data or the collection of data at a high frequency rate in a feeding system specifically associated with dairy cows, e.g., feeding systems that can be located behind locking headgates.

A further object of the present invention is to provide a feeding system having a number of feed troughs. Each feed trough is aligned with a headgate such that one animal at a time can approach and consume feed from a feed trough. Each feed trough is directly supported by one or more load cells which are supported on base frame members. Each one of the feed troughs is supported by one or more load cells which are configured such that the entire weight of each one of the feed troughs and the feed contained therein is focused on and completely supported by the respective one or more load cells for accurately determining the weight of the feed contained within the feed trough at any particular time. The load cells are configured so as to continually monitor and measure the weight of the respective feed trough and transmit such weight measurement signals to a processor and/or, via the transmission and receiving device, a remote computer. It is to be appreciated that the location of the processor and/or the transmission and receiving device can vary from one application to another application.

A still further object of the present invention is to provide a feeding system which facilitates easy removal of leftover feed from the troughs of the feeding stations. In such a feeding system, the base frame members support the associated feed trough and load cells in position relative to each other. The base frame members, feed trough and load cells can be pivoted about a pivot point that is located at the rear of the trough so as to change the orientation of the trough from feeding and discharge positions. In the set feeding position, the trough is oriented in front of the locking headgate such that the feed contained within the trough can be easily accessed by a cow located on the other side of the locking headgate. From the set feeding position, the front side of the trough closest to the locking headgate is pivoted up and away from the locking headgate while the back of the trough is tilted backward toward the ground. In the pivoted discharge position the leftover feed within the trough is emptied from the rear of the trough onto the ground. The leftover feed can then be collected and fed to the groups(s) of cattle that are not currently lactating. In this way the choicest feed is supplied to the highest milk producing cattle while the leftover feed is given to the cattle not currently producing milk.

The side-by-side arrangement of feed troughs enables simple and efficient distribution of feed to each feed trough of the feeding system. For example, in this arrangement, a supply source of bulk feed can be freely transferred to the interior of the individual feed troughs from the rear side of the feeding system. In a manner that is commonplace in the industry a feed truck is driven along the rear of the feed troughs and generally distributes feed into each feed trough according to a feeding schedule, i.e., at least once during the day. As a number of different nutrient and feed management programs exist for feeding animals and are well known in the art, a further description regarding the same is not believed to be necessary. Suffice it to say that the amount of feed, the types of feed, the nutritional characteristics of the feed and the times of the day at which feed is distributed to the animals can vary based on a number of considerations. Similarly, the means of distributing feed to the animals, specifically the means used for supplying feed to the feed troughs can vary drastically. However, all of the different ways of suppling feed to a feeding system, such as a feeding system including feed troughs generally result in the same outcome. That is, they all supply the feeding system, e.g., feed troughs with an amount of feed typically from a bulk supply of feed. In the case briefly described above a feed truck is used to transport a bulk supply of feed which is distributed according to a selected feeding schedule and the feed management program followed by the farm or production facility.

The present invention also relates to a feeding system for measuring, monitoring and managing feed intake to determine feed efficiency of individual animals of a dairy herd. The feeding system comprises at least one feed trough that contains an amount of feed that is to be consumed by the individual animals of the dairy herd. The at least one feed trough being arranged adjacent locking headgates such that, when the individual animals are positioned to consume the feed from the at least one feed trough, the locking headgates facilitating retaining the individual animals in position with respect to the at least one feed trough. At least one load cell is coupled to the at least one feed trough for detecting the weight of the feed contained within the at least one feed trough. Lifting assemblies support the at least one load cell. The lifting assemblies can be actuated to facilitate moving the at least one load cell and the at least one feed trough between a set feeding position in which the individual animals can consume the amount of feed contained within the feed trough and a pivoted discharge position in which the amount of feed is discharged from the feed trough.

The present invention also relates to a feeding system for measuring, monitoring and managing feed intake to determine feed efficiency of individual animals of a dairy herd. The feeding system comprises a plurality of feed troughs. Each of the feed troughs contains feed to be consumed by the individual animals of the dairy herd. Each of the plurality of feed troughs comprises a front panel that has an opening through which the individual animals, located in feeding positions, can access and consume the feed contained within the respective feed trough. Each of the plurality feed troughs further comprising a back panel that is angled away from the front panel. The plurality of feed troughs are arranged such that the front panels of the plurality of feed troughs are adjacent locking headgates sa as to retain the individual animals in the feeding position with respect to the plurality of feed troughs. Each of the plurality of feed troughs is supported on a pair of load cells which detect a weight of the feed contained within the plurality of feed troughs, respectively. The pairs of load cells communicate with a control station which receives weight data transmitted from the pairs of load cells. The pairs of load cells and the plurality of feed troughs are supported on a plurality of base frame members which are coupled to a plurality of lifting assemblies. Each of the plurality of lifting assemblies comprises a fixed member, a pivotable member having a first end that is pivotably coupled to the fixed member and an actuator having one end connected to the fixed member and another end connected to the pivotable member. A second end of the pivotable members of the plurality of lifting assemblies are fixed to the plurality of base frame members, respectively. The actuators of the plurality of lifting assemblies are can be actuated to pivot the pivotable members of the plurality of lifting assemblies to lift the plurality of feed troughs from a set feeding position, in which the individual animals can access and consume the feed contained within the plurality of feed troughs, to a pivoted discharge position in which remaining feed within the plurality of feed troughs is discharged along the back panel from the feed trough.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1-4, a brief description concerning the various components of the present invention will now be briefly discussed. As can be seen in this embodiment, the present invention relates to a feeding system 2 having a number of individual feed troughs 4 that are arranged in a row with their lateral sides closely adjacent each other and facing the same direction. Each of the feed troughs 4 is supported on one or more load cells 8 which in turn are supported on base frame members 10 that lie on the ground or floor of the structure in which the feeding system 2 is located. The load cells 8 function to measure the weight of the feed 12 contained within the feed trough 4. The base frame members 10 are coupled to lifting assemblies 14, each of which comprises angle arms 16, a piston/cylinder unit 18 and a footing 20. The footings 20 are preferably fixed relative to the ground or floor and serve to secure the lifting assembly 14 and stabilize the feeding system 2. One end of the angle arms 16 is pivotally connected to the footing 20 while the opposite ends of the angle arms 16 are secured to the base frame members 10. The ends of the piston/cylinder unit 18 are connected to the footing 20 and the angle arms 16, respectively. The piston/cylinder unit 18 can be actuated or controlled, i.e., pressurized so as to lift or pivot the angle arms 16 and thus the base frame members 10, load cells 8 and feed troughs 4 to the pivoted discharge position (see FIG. 4) in which the contents, i.e., leftover feed 12 is discharged from or emptied out of the feed troughs 4.

Figure 1:
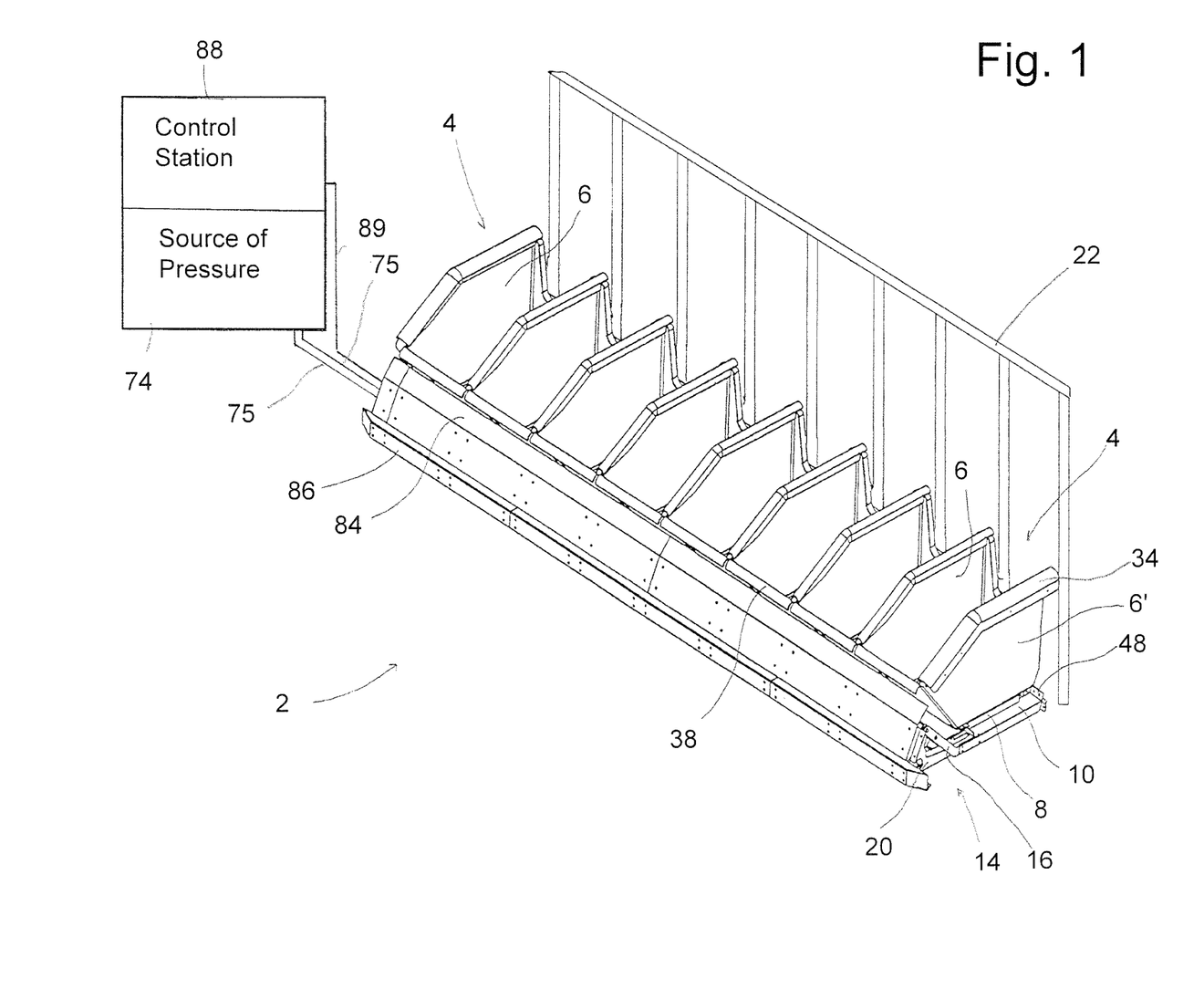
FIG. 1 is a view of a feeding system according to the invention having number of feed troughs which are shown in a set feeding position.

As shown in FIG. 1 the feeding system 2 can comprise one or more locking headgates 22 (only show diagrammatically). In the following description, the components of the feeding system 2 may be described in relation to their position relative to the feed troughs 4. As such, the end or side of the feed troughs 4 through an animal facing the animal while the animal is feeding is referred to as the front of the feed trough 4, while the end or side of the feed troughs 4 opposite the animal while the animal is feeding is referred to the back or rear of the feed trough 4. As shown, the front of the feed troughs 4 is located adjacent the locking headgates 22. The locking headgates 22 can be connected to the feeding system 2 directly or can be anchored to the ground or floor directly in front of the feeding system 2. The feed troughs 4 of the feeding system 2 are aligned with the locking headgates 22 such that one animal at a time can approach and consume feed 12 from a feed trough 4. It is important to note that the locking headgates 22 are spaced from the front of the feed troughs 4 such that as the feed troughs 4 pivot from a set feeding position to a pivoted discharge position they do not come into contact with the locking headgates 22 while at the same time the locking headgates 22 need to be close enough to the feed troughs 4 to allow animals to easily access the feed 12 contained within the feed trough 4 through the locking headgates 22.

Figure 2:
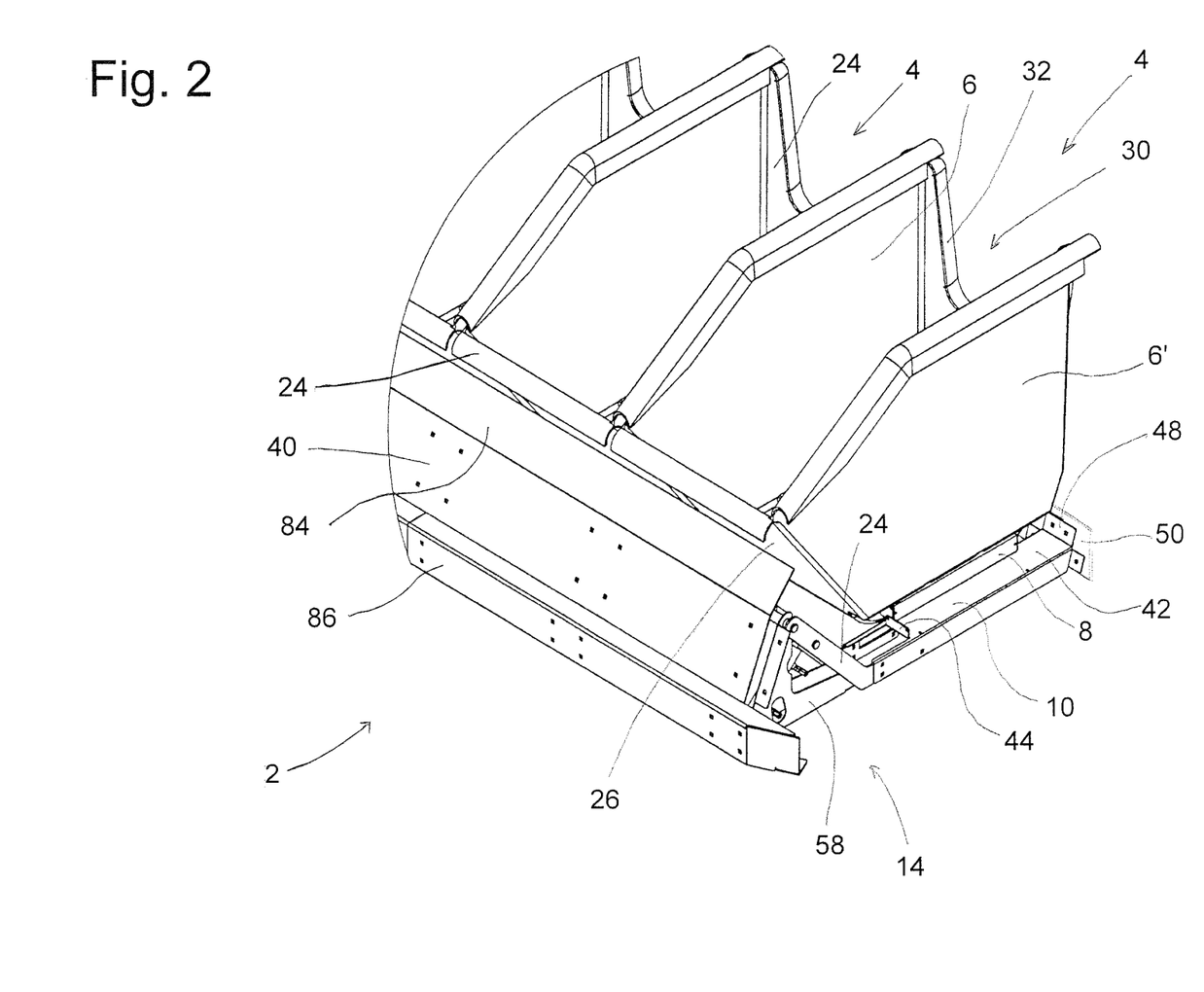
FIG. 2 is a detailed close up view of the feeding system according to the invention showing a pair of feed troughs.
Figure 3:
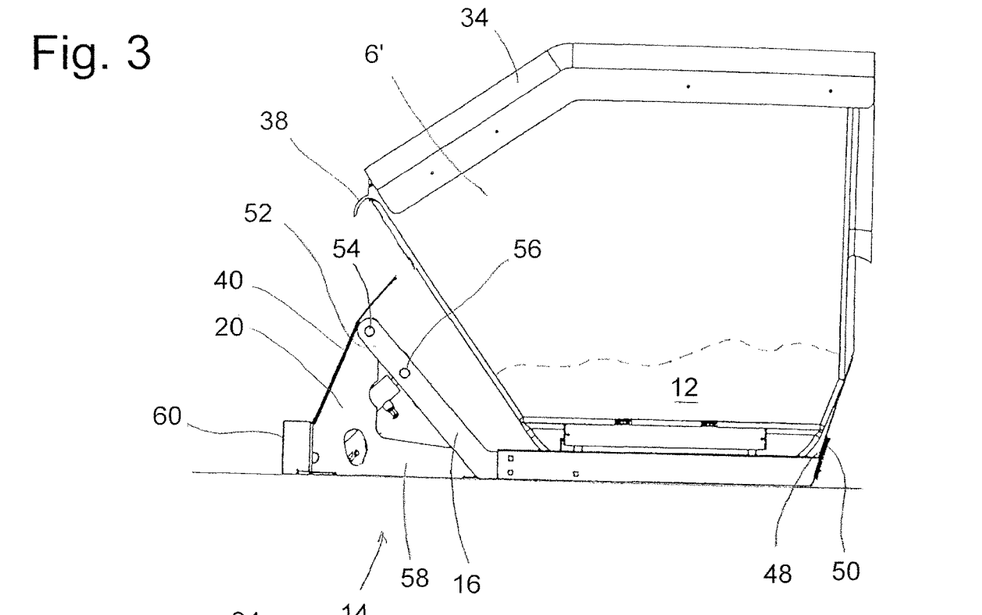
FIG. 3 is a side view of the feeding system according to the invention with the feed trough arranged in the set feeding position.

The feeding system 2 is illustrated as comprising a number of feed troughs 4, specifically the feeding system 2 shown in FIG. 1 has eight feed troughs 4 and FIG. 2 shows a closeup view of only a portion of the feeding system 2 illustrated in FIG. 1. The feeding systems 2 of FIGS. 5 and 6 diagrammatically show cross-sectional views of feeding systems 2 having two and three feed troughs 4, respectively. As the inventive feed troughs 4 and corresponding load cells 8, base frame members 10 and lifting assemblies 14 can be easily coupled to each other, in the manner described below, it is to be understood that the feeding system 2 according to the invention can be configured to include any number of feed troughs 4 and is not limited to the number of feed troughs 4 illustrated herein. In relation to the number of feed troughs 4 of the feeding system 2, the number of lifting assemblies 14 that are used to lift the feed troughs 4 from the set feeding position (see FIG. 3) to the pivoted discharge position (see FIG. 4) may also vary depending on factors described below. In view of this, the number of lifting assemblies 14 of the inventive feeding system 2 should not be limited to the number of lifting assemblies 14 illustrated herein.

An embodiment of the feeding system 2 according to the invention will now be described with reference to FIGS. 1-4. Each of the feed troughs 4 of the feeding system 2 is formed left and right two side panels 6, 6', front and rear panels 24, 26 and a bottom panel 28 that together contain an amount of feed 12 that is to be consumed by an animal. Except for the rear panel 26, the panels 6, 6', 24, 28 are generally arranged so as to be at least somewhat perpendicular to each other. It is to be recognized however that this arraignment of the side 6, 6', front 24 and bottom panels 28 is not vital and that other arrangement of these panels are just as feasible. The rear panel 26 is arranged at an angle with respect to the bottom panel 28. As best shown in the side view of FIGS. 3 and 4, the rear panel 26 tilts relative to the bottom panel 28 away from the front of the feed trough 4. That is to say in other words, the rear panel 26 is angled outwardly from the interior of the feed trough 4. Due to this arrangement of the rear and bottom panels 26, 28, unconsumed or leftover feed 12 can be easily emptied, dumped or discharged from the interior of the feed trough 4 by pivoting the feed trough 4 upward from the set feeding position to the pivoted discharge position as will be discussed in more detail below. The front panel 24 is configured so as to have an access opening 30. Specifically, the top edge of the front panel 24 curves downward toward the bottom panel 28 of the feed trough 4 thereby forming the access opening 30 which enables an animal to easily access feed 12 contained within the feed trough 4. The top edge of the front panel 24 is configured as a rim 32 with a rounded surface that extends forward away from the interior of the feed trough 4. The smooth rounded surface of the rim 32 helps to prevent or reduce the occurrence abrasion or chafing of the hide of the animal as the animal introduces and withdraws its head through the access opening 30.

Figure 4:
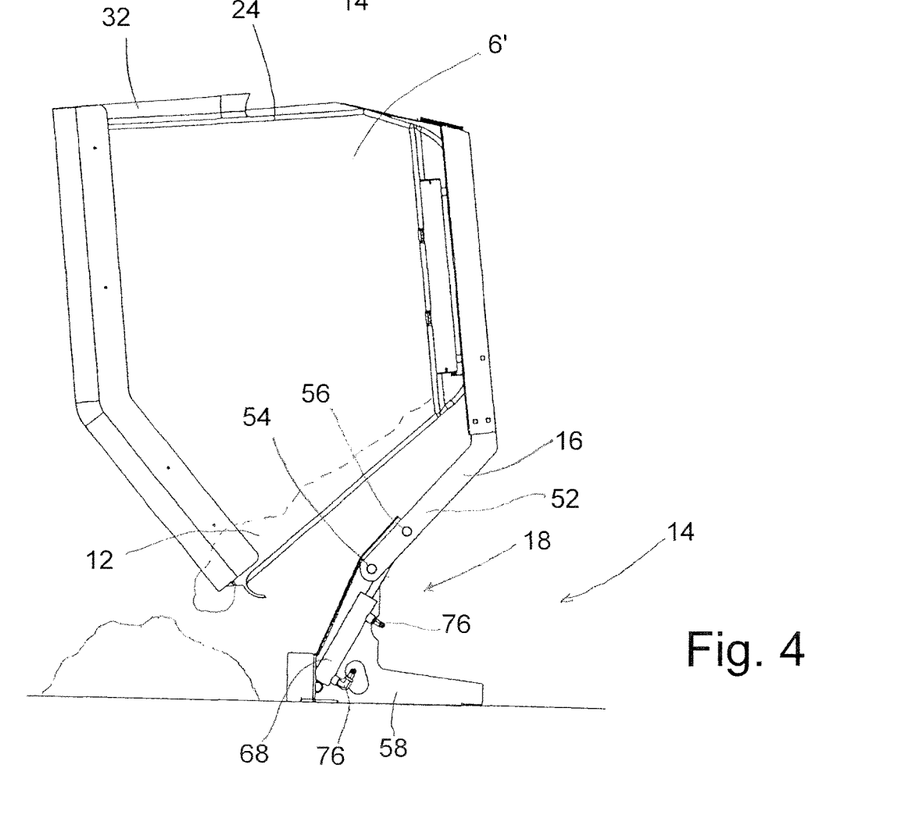
FIG. 4 is another side view of the feeding system according to the invention showing a feed trough in a pivoted discharge position.
Figure 5:
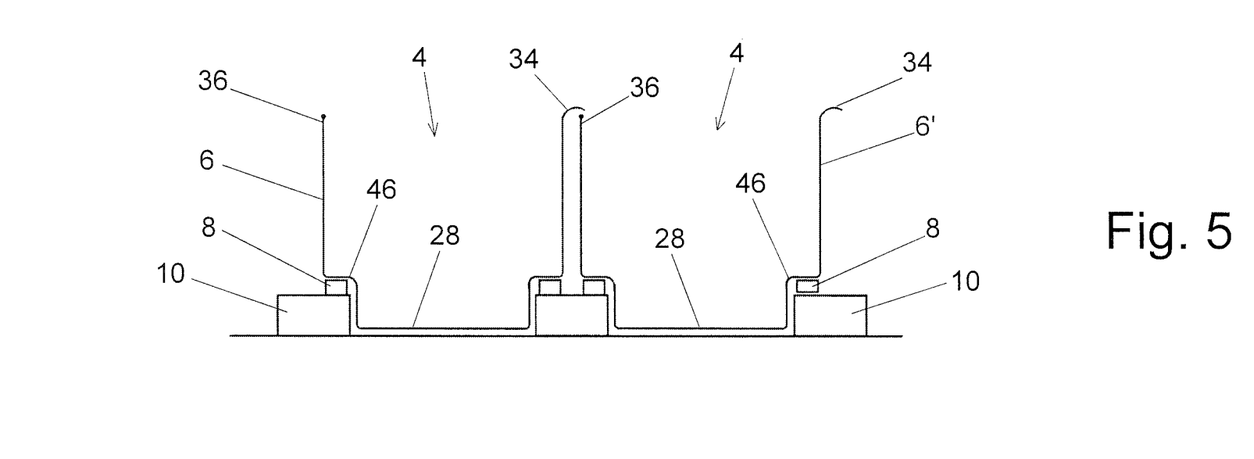
FIG. 5 is a diagrammatic sectional view of a feeding system according to the invention having two feed troughs.
Figure 6:
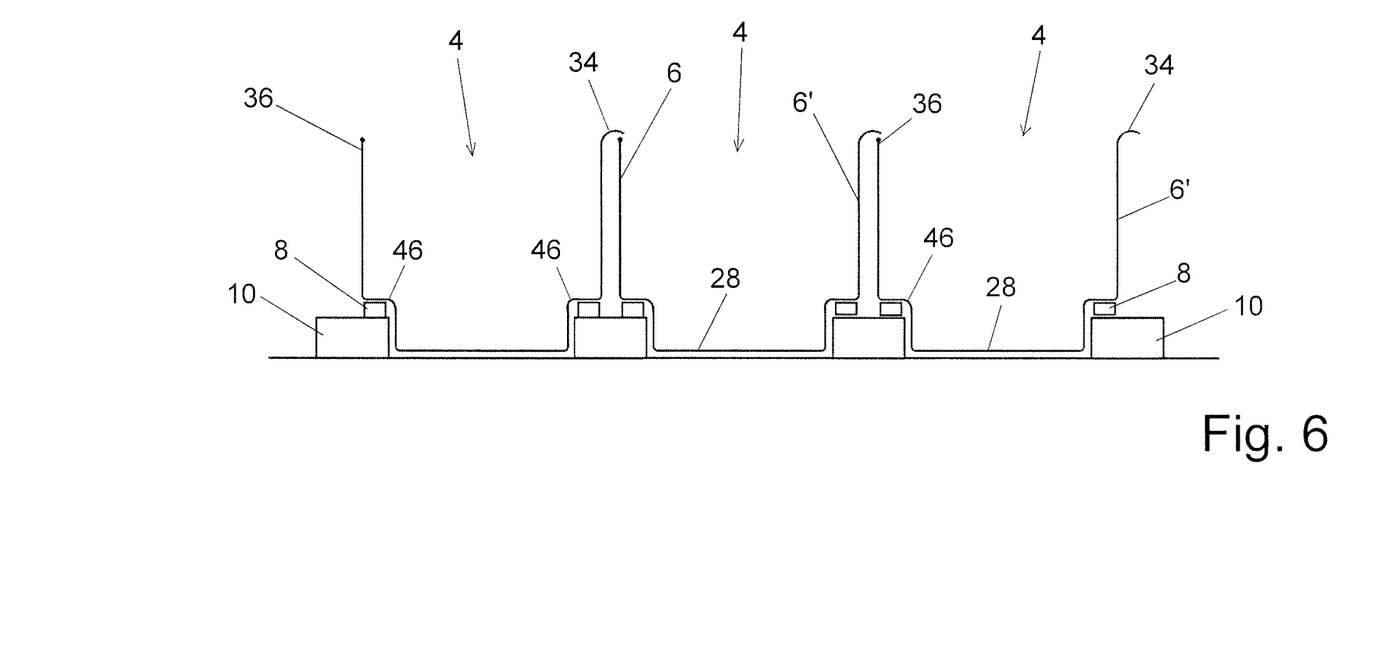
FIG. 6 is a diagrammatic sectional view of a feeding system according to the invention having three feed troughs.

As shown in the diagrammatic cross sectional views of FIGS. 4 and 5, the top edge of the right side panel 6' is rounded and forms a side deflection lip 34 while the top edge 36 of the left side panel 6, in contrast, is merely a common flat edge. When two feed troughs 4 are arranged adjacent each other such that the left side panel 6 of a first one of the feed troughs 4 is close to the right side panel 6' of a second feed trough 4, the side deflection lip 34 of the second feed trough 4 extends over the top edge 36 of the first feed trough 4. The overlapping side deflection lip 34 thus covers the gap between the side panels 6, 6' of the adjacent feed troughs 4 and prevents feed 12 from falling therebetween as it is distributed to the feed troughs 4. Similarly, as best shown in the side views of FIGS. 3 and 4, the top edge of the rear panel 26 has a curved rear deflection lip 38 that extends backwards from the feed trough 4. The rear deflection lip 38 also functions to prevent feed 12 from falling between the rear of the feed trough 4 and rear guard plates 40 that cover and protect the lifting assemblies 14.

As briefly noted above each feed trough 4 is supported on one or more load cells 8. The load cells 8 are situated to continually detect and measure the combined weight of the feed trough 4 and the feed 12 contained therein. The weight measurements are transmitted to a remote processor which records and processes the weight measurements in a manner that is known. Since the function of load cells 8 for measuring and transmitting weight measurement data are known a detailed description of the same is not believed to be necessary and will only be briefly described below. Although FIGS. 5 and 6 show that each feed trough 4 of the feeding system 2 is supported on and weighed by two load cells 8, it is to be understood that the number and arrangement of load cells 8 used to support and measure the weight of each of the feed troughs 4 is not necessarily critical. An important consideration regarding the number and arrangement of load cells 8 in relation to the feed troughs 4 is that the load cells 8 should be arranged so as to bear the weight of the feed trough 4 and its contents as evenly as possible. The even or balanced distribution of weight on the load cells 8 helps to increase the accuracy of the weight values measured thereby. In the embodiment illustrated in FIGS. 5 and 6, each of the feed troughs 4 is supported by a pair of load cells 8 that are arranged along the opposite lateral sides of the feed trough 4 and which extend between the front and the rear of the feed trough 4. This arrangement provides a stable support for the feed trough 4 not only side to side but also front to back. In another embodiment (not shown), it is possible for each feed trough 4 to be supported on four load cells 8 that are arranged at the bottom corners of the feed trough 4.

The load cells 8 are supported on the tops of the base frame members 10 which rest upon the ground or floor when the feeding system 2 is arranged in the usual set feeding position. The elongate base frame members 10 are arranged so as to extend along the sides of the feed trough 4 from the front to the rear of the feed trough 4. The base frame members 10 comprise one or more elongate plates that are integrally connected to each other so as to form top surface 42 on which the load cells 8 can be fixed and provide a stable support for the feed trough 4. The base frame members 10 can be hollow so as to receive corresponding ends of the angle arms 16 which are rigidly secured to the base frame members 10 such as by nuts/bolts, rivets or welds for example. It is to be appreciated that the ends of the angle arms 16 can alternatively be rigidly secured to the outside of the base frame members 10. Although the base frame members 10 are shown as having a rectangular cross section, it is to be appreciated that other configurations of the base frame members 10 are possible as long as the base frame members 10 can be positioned at least partially, vertically below the load cells 8. With this configuration, the combined weight of the feed trough 4 and its contents is directed at least substantially vertically downward such that laterally directed forces of the feed 12 need not be considered. The top surface 42 of the base frame members 10 have a width that enables one load cell 8 from each of two adjacent feed troughs 4 to be secured along the opposite sides of the top surface 42 with a gap located therebetween. The gap between the side panels 6, 6' of two adjacent feed troughs 4 ensures that the two feed troughs 4 do not contact one another and influence the weight measurements of the respective load cells 8. The top surface 42 of the base frame member 10 also has an uplifted stop flange 44 which is arranged so as to contact the end of the load cell 8. The stop flange 44 functions to stop or prevent relative displacement of the load cell 8 as the feed trough 4 is lifted up to the pivoted discharge position.

Also shown in FIGS. 5 and 6, each of the side panels 6, 6' of the feed troughs 4 has a shoulder 46 that extends from the front to the rear of the feed trough 4 along the bottom of the feed trough 4. Each shoulder 46 has a generally, horizontally aligned surface and is sized such that the corresponding load cell 8 is at least partially received within an area formed by the shoulder 46 vertically below the horizontally aligned surface. The bottom panel 28 is arranged so as to be closer to the ground or floor in comparison to the horizontally aligned surfaces of the feed trough 4. The relatively low bottom panel 28 of the feed trough 4 results in a low center of gravity of the feed trough 4 and its contents. This helps to reduce the amount of torque that is placed on the load cells 8 when the feed trough 4 is lifted up to the pivoted discharge position.

Due to the fact that each base frame member 10 is capable of supporting the adjacent sides of two feed troughs 4, it should be recognized that the number of base frame members 10 needed to support the feeding system 2 depends on the number of feed troughs 4 of the feeding system 2. For example, if the feeding system 2 is to include a single feed trough 4, then two base frame members 10 arranged under the left and right side panels 6, 6' of the feed trough 4, respectively, will be needed for supporting said load cells 8 and feed trough 4. However, only three base frame members 10 are needed to support two feed troughs 4 as shown in FIG. 5 since, in this case, a common or shared base frame member 10 is centrally located between the outer base frame members 10 and functions to support a load cell 8 from each of the adjacent feed troughs 4. Generally, the number of base frame members 10 needed to support the feeding system 2 is one more than the number of feed troughs 4 of the feeding system 2. As best shown in FIG. 2 the front ends of the base frame members 10 have one or more coupling flanges 48. The coupling flanges 48 can be used to mount a coupling plate 50 across the front ends of a number of base frame members 10. When secured to the coupling flanges 48, the coupling plate 50 functions to fix the base frame members 10 in relation to each other. This helps to increase the rigidity of the feeding system 2 such that the row of the feed troughs 4 operate as a single element as apposed to a number of individual elements. Making the feed trough 4 so as to function as a single element is beneficial when lifting the feed troughs 4 to the pivoted discharge position as further described below.

Figures 7, 8:
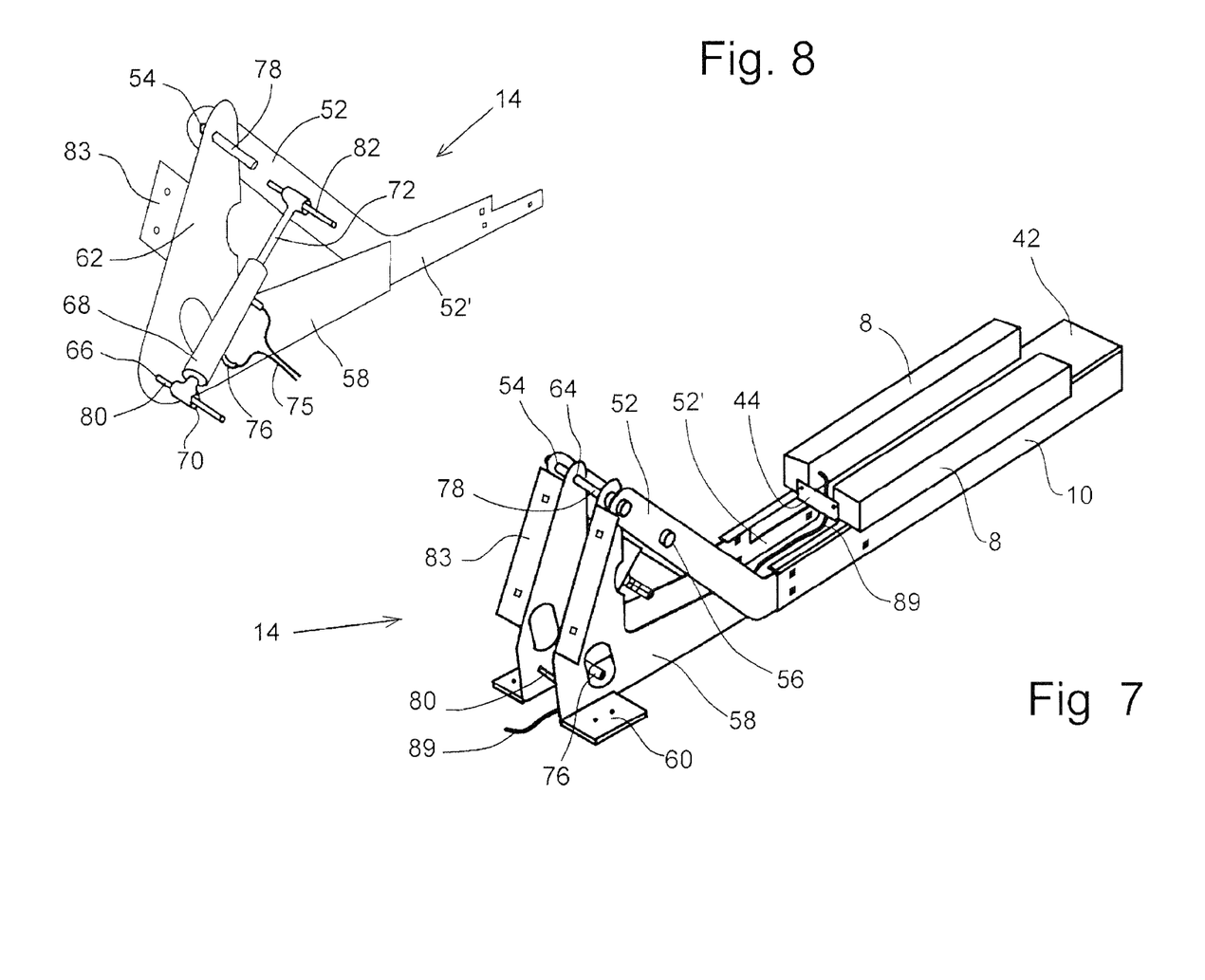
FIG. 7 is a view of a base frame member and load cells connected to a lifting assembly of the feeding system according to the invention arranged in the set feeding position.
FIG. 8 is a view of a portion of a lifting assembly showing an arrangement of the piston/cylinder unit in relation to a footing and angle arm.

As briefly described above, the rear ends of the base frame members 10 are connected to ends of a pair angle arms 16 of a lifting assembly 14. Lifting assemblies 14 are shown in FIGS. 7-10 and include angle arms 16, a piston/cylinder unit 18 and footings 20. The angle arms 16 can be rigidly connected as best shown in FIG. 7, to the rear ends of the base frame members 10 in any known manner, e.g., bolted, riveted, welded, etc. Each angle arm 16 has two arm portions 52, 52' with an elbow arranged there between such that the two arm portions 52, 52' extend at an angle relative to each other. The angle formed between the two arm portions 52, 52' of the angle arm 16 is approximately between 35 and 55 degrees. More preferably the angle between the two arm portions 52, 52' of the angle arm 16 is approximately 45 degrees. Each of the angle arms 16 has first and second pivot points 54, 56 that are arranged along the arm portion 52 of the angle arm 16. The first pivot point 54 is located at a remote end of the arm portion 52 while the second pivot point 56 is located along the arm portion 52 between the first pivot point 54 and the elbow.

The lifting assemblies 14 are supported on the ground or floor by a pair footings 20 which function to anchor the feeding system 2. Each footing 20 comprises a base segment 58 that is seated on the ground or floor and holds the feeding system 2 in place as the lifting assembly 14 pivots the feed troughs 4 into the pivoted discharge position. The base segments 58 of the footings 20 can be anchored to the ground or floor for example by way of tabs 60 that receive anchor bolts for example. The base segment 58 can also be sufficiently sized so as to support and maintain the position of the feeding system 2 as the feed troughs 4 are lifted over a range of pivot positions from the usual set feeding position on the ground or floor up to the pivoted discharge position. The footings 20 have an upward section 62 that comprises an upper pivot point 64 located at the remote end of the upward section 62. The angle arms 16 and the footings 20 are generally planar members that can be formed from metallic plates and when assembled, the footings 20 and the angle arms 16 are arranged parallel to each other such that the upper pivot points 64 of the footings 20 are aligned with the first pivot points 54 of the angle arms 16. The footings 20 also have a lower pivot point 66 that is located in a rear area of the footing 20 close to the ground or floor and which will be discussed below.

Figure 9:
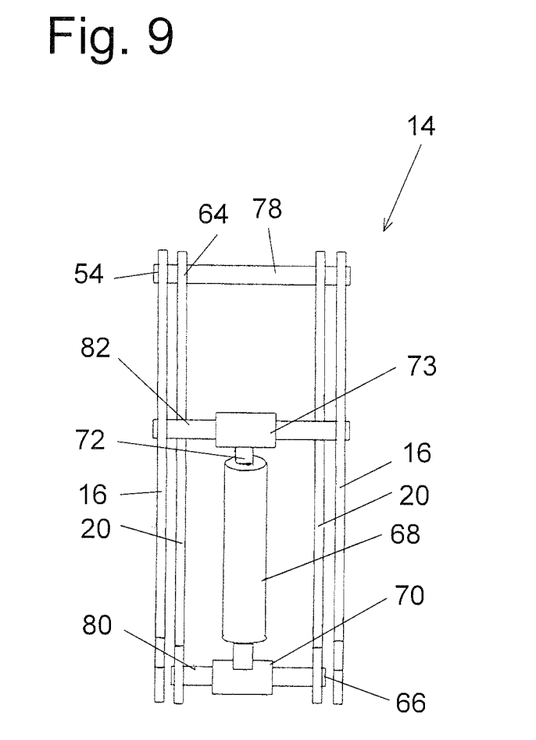
FIG. 9 is a view of a lifting assembly with the piston/cylinder unit arranged in a retracted condition.
Figure 10:
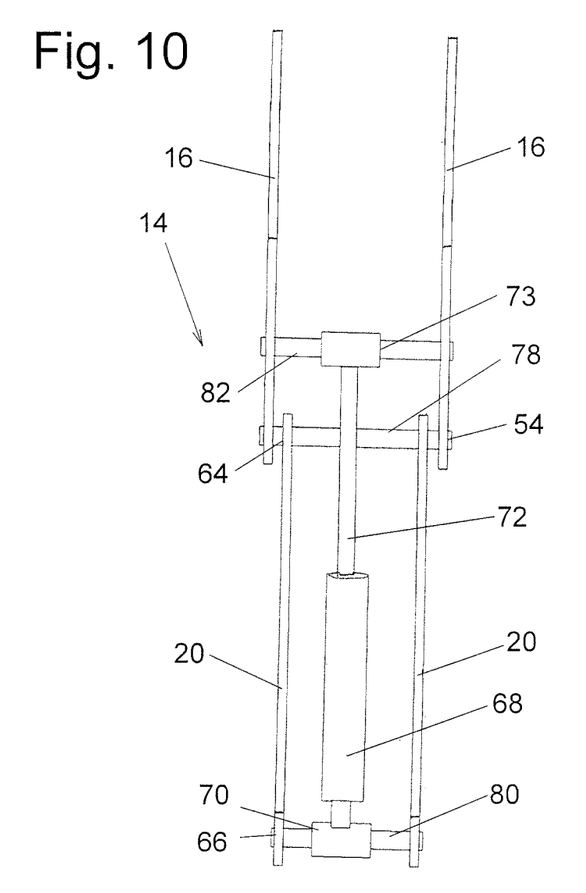
FIG. 10 is a view of a lifting assembly with the piston/cylinder unit arranged in an extended condition.
Figure 11:
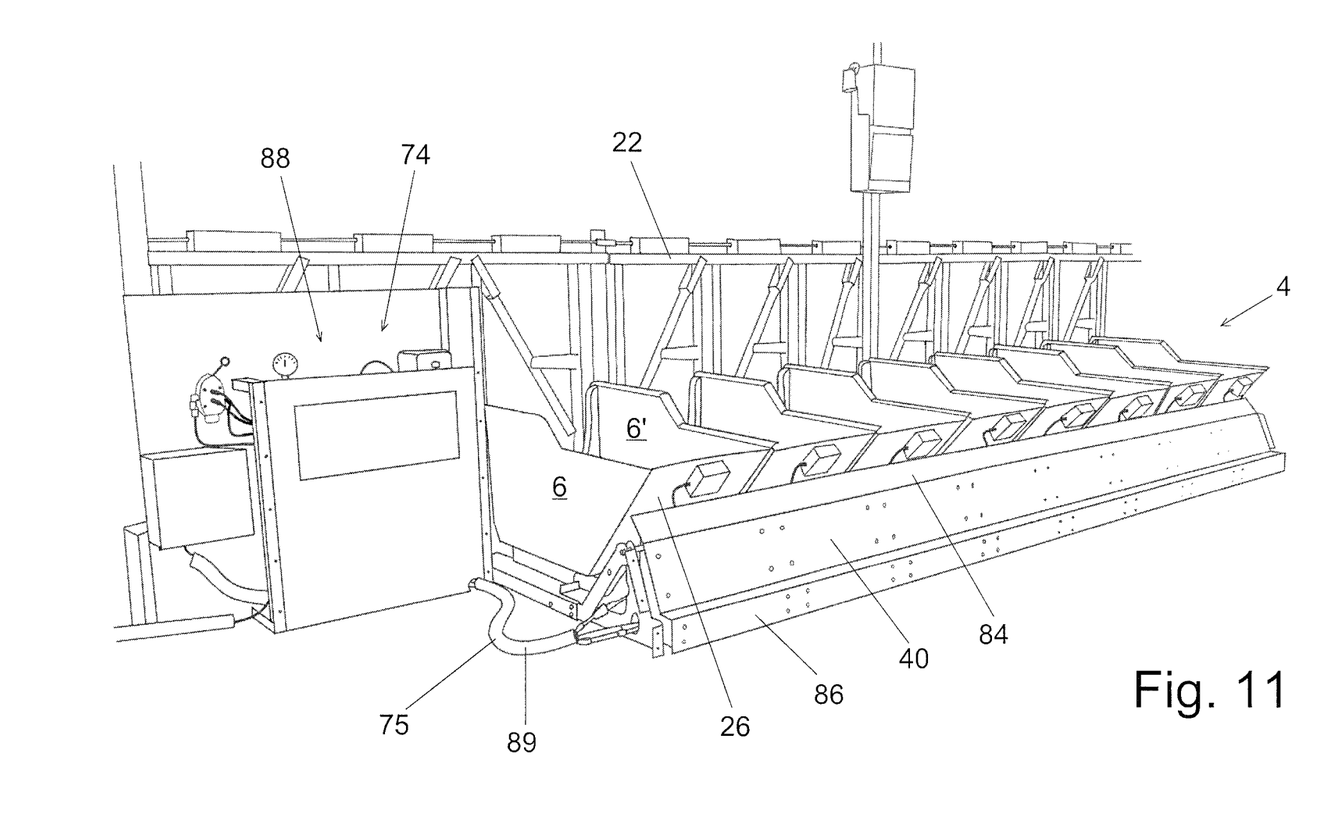
FIGS. 11-13 show additional views of the invention.
Figure 12:
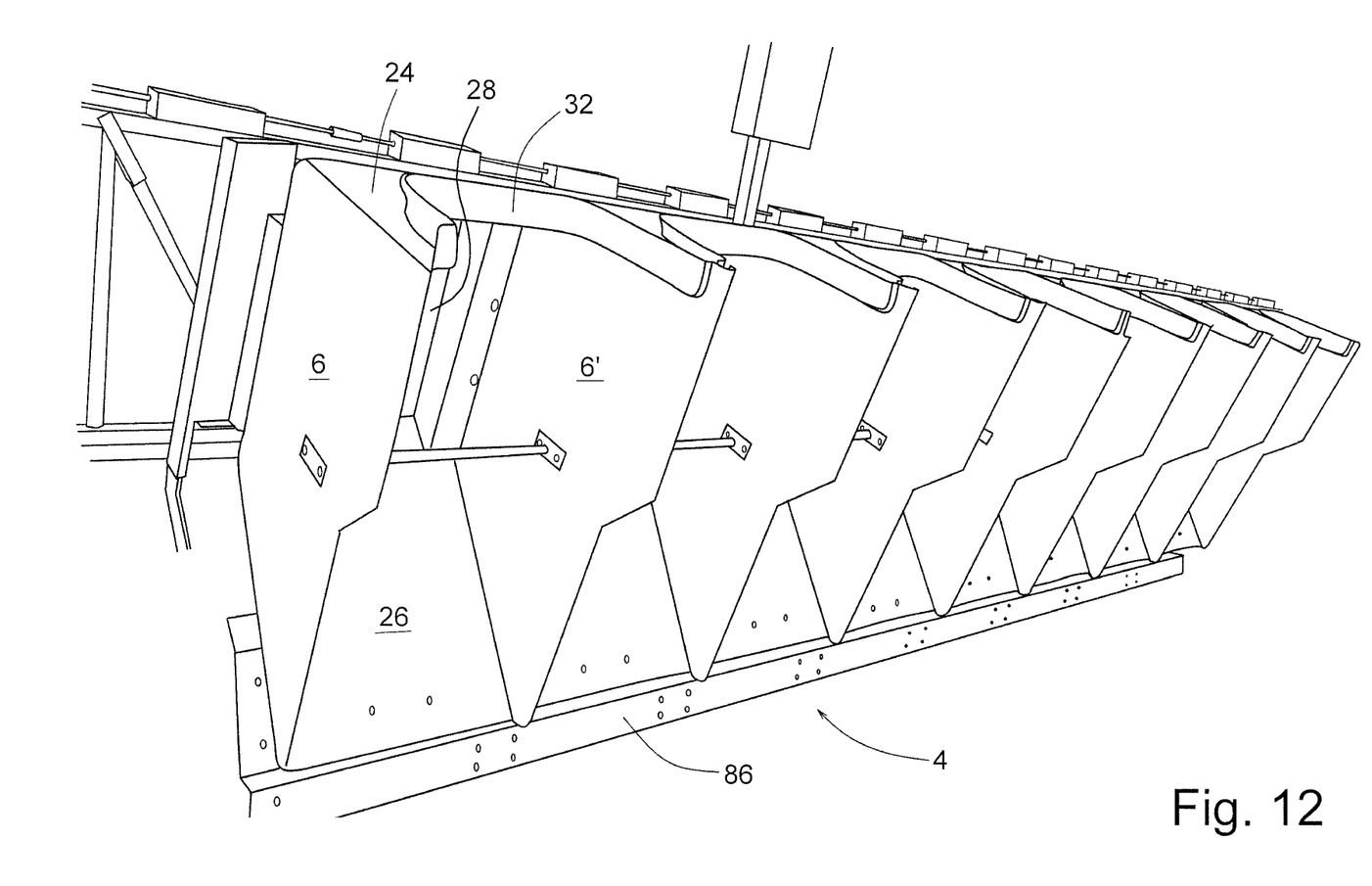
Figure 13:
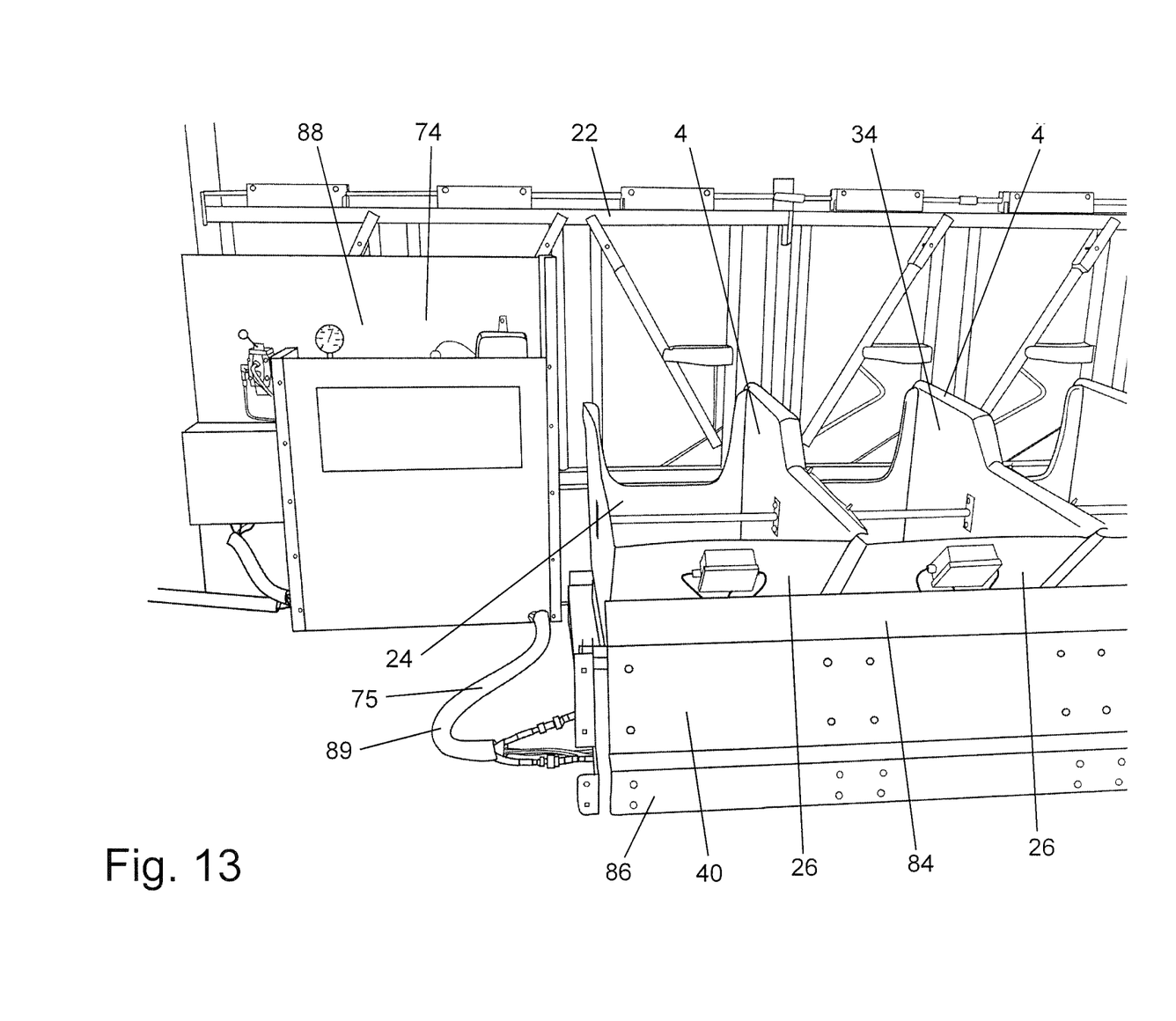

The lifting assembly 14 further includes a piston/cylinder unit 18. The cylinder 68 has a first end comprising a bushing 70. As generally known, the piston is arranged within the cylinder 68 and divides the interior of the cylinder 68 into two separate chambers. A piston rod 72 is fixed to the piston and extends axially through a second end of the cylinder 68. A source of pressure 74 (only shown diagrammatically) is connected, via conduits 75 and fittings 76, to the two chambers of the cylinder 68. In a known manner, pressure from the pressure source 74 can be controlled, e.g., by valves so as to selectively direct and regulate the pressure supplied to the chambers. By controlling pressurization of the chambers the piston can be axially biased between a retracted condition and an extended condition. In the retracted condition, as shown in FIG. 9, the piston is located adjacent the first end of the cylinder 68 such that the piston rod 72 is substantially retracted within the cylinder 68 and the overall axial length of the piston/cylinder unit 18 is at a minimum. In the extended condition, as shown in FIG. 10, the piston is located near the second end of the cylinder 68 such that the piston rod 72 substantially fully extends through the second end of the cylinder 68 and the overall axial length of the piston/cylinder unit 18 is at a maximum. Suffice it to say that the piston/cylinder unit 18 can be actuated pneumatically or hydraulically for example.

For a more clear understanding of a lifting assembly 14 in an assembled condition, FIG. 4 shows the lifting assembly without one of the footings 20 and FIG. 8 shows the lifting assembly 14 without one of the angle arms 16 and footings 20. The lifting assembly 14 includes a pivot pin or rod 78 that passes through the upper pivot points 64 of the footings 20 and the first pivot points 54 of the angle arms 16. In this position, the pivot pin 78 defines a rotational axis about which the angle arms 16 can be rotated with respect to the footings 20. The pivot pin 78 can be rigidly connected to either the footings 20 or the angle arms 16 of the lifting assembly 14 and pivotally connected to the other of the footings 20 and the angle arms 16. For example, the opposite ends of the pivot pin 78 can be rigidly fixed to the first pivot points 54 of the angle arms 16 and pass through bearings or bushings in the upper pivot points 64 of the footings 20 such that the angle arms 16 and the pivot pin 78 rotate together with respect to the footings 20. However, it is also possible for the pivot pin 78 to be connected so as to rotate with respect to both of the footings 20 and the angle arms 16. In such a case, the rotating pivot pin 78 would require a rotating connection be made between each of the upper pivot points 64 of the footings 20 and first pivot points 54 of the angle arms 16.

The first end of the cylinder 68 is connected, via a bearing or bushing 70, to a pivot pin 80 that is fixed in the lower pivot points 66 of the footings 20 close to the ground or floor. A remote end of the piston rod 72 is connected, via a bearing or bushing 73, to a pivot pin 82 that is fixed in the second pivot points 56 of the angle arms 16. Due to the connections of the first end of the cylinder 68 and the remote end of the piston rod 72 with the pivot pins 80, 82 of the footings 20 and angle arms 16, respectively, the ends of the piston/cylinder unit 18 are fixed to the footings 20 and angle arms 16 in a pivotal manner.

With the piston/cylinder unit 18 in the retracted condition, in which the piston rod 72 is substantially retracted within the cylinder 68, the axial length of piston/cylinder unit 18 is at generally at a minimum. Actuation of the piston/cylinder unit 18, i.e., pressurization of one of the chambers in the cylinder 68 drives the piston rod 72 into the extended condition in which the piston rod 72 projects from the second end of the cylinder 68 such that the axial length of the piston/cylinder unit 18 is at a maximum. Thus actuation of the piston/cylinder unit 18 forces the angle arms 16 to pivot upwardly away from the floor, thereby lifting the base frame members 10, load cells 8 and feed troughs 4 into the pivoted discharge position.

It is to be appreciated that the rotational axes, i.e., the corresponding pivot pins 78, 80, 82 of all of the lifting assemblies 14 are aligned with each other such that the rotational axes of the lifting assembly 14 at one end of the row of feed troughs 4 are coaxial with rotational axes of the lifting assembly 14 at the opposite end of the row of feed troughs 4. In this manner, the angle arms 16 of all of the feed troughs 4 of the feeding system 2 rotate about a common rotational axis. Although the feeding system 2 may comprise only one feed trough 4, it is preferred that the feeding system 2 include at least two lifting assemblies 14. A feeding system 2 having a single feed trough 4 is generally supported on a pair of load cells 8 which are, in turn, each supported on individual base frame members 10. In this case, it is preferable for each base frame member 10 to be connected to and lifted by an individual lifting assembly 14 such that both sides of the feed trough 4 are lifted at the same time. In a feeding system 2 that includes two feed troughs 4, these feed troughs 4 are generally supported by four or more load cells 8 which are supported by only three base frame members 10, however it is possible that only the base frame members 10 located at the outer lateral sides of the feeding system 2 are connected to and lifted by corresponding lifting assemblies 14. It should be understood that the number of lifting assemblies 14 used to lift a number of feed troughs 4 is dependant on how rigidly the base frame members 10 of a feeding system 2 are connected together. In other words, if the base frame members 10 of three or four feed toughs 4 are rigidly connected to each other by way of a coupling plate 50 for example, it is possible that all of the feed troughs 4 can be lifted by a two lifting assemblies 14, one being located on each end of the row of feed troughs 4. If the base frame members 10 of the feeding system 2 are not connected together rigidly, i.e., if there is relative movement between base frame members 10 as the feed troughs 4 are lifted, in order to avoid or prevent possible damage to the feeding system 2 it is preferable that more lifting assemblies 14 be utilized for lifting the feed troughs 4.

As shown in FIGS. 1-4, the lifting assemblies 14 are generally arranged at the back of the feed troughs 4 and at least partially located underneath the rear panels 26 of the feed troughs 4. A rear guard plate 40 is fixed to the rear side of the lifting assemblies 14 and functions to cover and protect the lifting assemblies 14. The rear guard plate 40 can be connected to the rear side of the footings 20 directly or via connection flanges, angle irons or angle brackets 83. An upper portion 84 of the rear guard plate 40 is slightly angled toward the rear panel 26 of the feed trough 4 and acts to reduce the gap between the rear of the feed trough 4 and the rear guard plate 40. In addition to the rear guard plate 40, the rear deflection lip 38 of the rear panel 26 of the feed trough 4 extends rearward over the top of the rear guard plate 40 thereby reducing the amount of debris and/or feed falling between the rear of the feed trough 4 and rear guard plate 40.

A housing 86 is configured below the rear guard plate 40 and extends along the length of the feeding system 2. The housing 86 comprises elongate narrow plates including a face plate which may be removable from the housing 86 so as to allow access to the passage formed thereby. The housing 86 functions to protect conduits 75, hoses, or other hydraulic or pneumatic pressure lines and or cables, wires or other electrical leads that may be utilized in the operation of the feeding system 2.

The feeding system 2 comprises control station 88 (only shown diagrammatically) from which operation and control of the feeding system 2 can be managed. The control station 88 can include the source of pressure 74 and a means of controlling a flow of the pressure from the source thereof to the piston/cylinder units 18; and a system for measuring, monitoring, and managing animals including a micro-processor, a communication device and a central computer as suitably described in U.S. 62/468,634, the description of which is fully incorporated herein by reference thereto. As shown in FIG. 1 the control station 88 is located at an end of the row of feed troughs 4, however it is to be recognized that the control station 88 can be located at other locations in relation to the row of feed troughs 4. The hydraulic or pneumatic pressure source 74 can be in the form of a hydraulic pump, pneumatic pump, a pressure tank or a pressure reservoir. As such sources of hydraulic or pneumatic pressure are well known in the art, the same will not be discussed further. The pressure source 74 can communicate with the piston/cylinder units 18 of the lifting assemblies 14 either individually or collectively. Preferably, each of the piston/cylinder units 18 communicate with the pressure source 74 via a pair of pressure conduits 75. One or more valves are manually or automatically controlled so as to direct pressure to one of the chambers in the cylinder 68 while the pressure in the other chamber is released. The pressure conduits 75 can pass through the passage formed by the housing 86 and communicate, via fittings 76, with one of the chambers of the piston/cylinder unit 18. In this manner the individual piston/cylinder unit 18 can be simultaneously actuated by means a single valve such that all of the feed troughs 4 will be pivoted at least substantially at the same time.

As is known in the art, a system for measuring, monitoring, and managing animals comprises load cells 8 which are used for measuring weight. In this case the weight of the feed trough 4 and the feed 12 contained therein is measured. An important feature of the load cells 8, according to the present invention, is that they should be configured so as to continually monitor and measure the weight of the feed trough 4 and feed 12 contained therein and transmit these weight measurements to the micro-processor and the remote computer for recordation and analysis thereof. Each of the load cells 8 communicates with the micro-processor via an electrical conduit 89 that extends through the passageway formed by the housing 86.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a !imitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

I claim:

1. A feeding system for measuring, monitoring and managing feed intake to determine feed efficiency of individual animals of a dairy herd, the feeding system comprising:

at least one feed trough for containing an amount of feed to be consumed by the individual animals of the dairy herd;

the at least one feed trough being arranged adjacent a gate, the gate enabling only one of the individual animals to be positioned to consume the feed from the at least one feed trough at a time, the gate facilitating retaining the single individual animal in position with respect to the at least one feed trough;

at least one load cell being coupled to the at least one feed trough for detecting a weight of the feed contained within the at least one feed trough;

lifting assemblies supporting the at least one load cell, the lifting assemblies being actuatable to facilitate moving the at least one load cell and the at least one feed trough between a set feeding position in which the individual animals consume the amount of feed contained within the feed trough and a pivoted discharge position in which the amount of feed is discharged from the feed trough;

base frame members, the base frame members support the at least one load cell and the at least one feed trough; and the lifting assemblies comprising angle arms and footings, first ends of the angle arms being fixed to the base frame members and opposite second ends of the angle arms being pivotably coupled to second ends of the footings, actuators having one end coupled to remote first ends of the footings and an opposite end coupled to the angle arms at a position offset from the second ends of the angle arms, the actuators being actuatable between an extended condition and a retracted condition such that, in the extended condition of the actuators, the at least one load cell and the at least one feed trough are arranged in the pivoted discharge position, and, in the retracted position of the actuators, the at least one load cell and the at least one feed trough are arranged in the set feed position.

2. The feeding system according to claim 1, wherein each of the at least one feed troughs comprises a front panel and a back panel, the front panel having an opening through which the individual animals can access and consume the amount of feed contained within the feed trough, the back panel being arranged at an angle away from the front panel such that when the feed trough is lifted to the pivoted discharge position by the lifting assemblies, the amount of feed is discharged from the feed trough along the back panel.

3. The feeding system according to claim 1, wherein each of the at least one feed trough is coupled to a pair of load cells and supported by a pair of the base frame members.

4. The feeding system according to claim 1, wherein each of the actuators is coupled to a control station which controls actuation of the actuators such that actuation of all of the actuators and lifting of the feed trough to the pivoted discharge position is substantially simultaneous.

5. A feeding system for measuring, monitoring and managing feed intake to determine feed efficiency of individual animals of a dairy herd, the feeding system comprising:

at least one feed trough for containing an amount of feed to be consumed by the individual animals of the dairy herd;

the at least one feed trough being arranged adjacent a gate, the gate enabling only one of the individual animals to be positioned to consume the feed from the at least one feed trough at a time, the gate facilitating retaining the single individual animal in position with respect to the at least one feed trough;

at least one load cell being coupled to the at least one feed trough for detecting a weight of the feed contained within the at least one feed trough;

lifting assemblies supporting the at least one load cell, the lifting assemblies being actuatable to facilitate moving the at least one load cell and the at least one feed trough between a set feeding position in which the individual animals consume the amount of feed contained within the feed trough and a pivoted discharge position in which the amount of feed is discharged from the feed trough; and the lifting assemblies comprise:
a pair of footings and a pair of angle arms;
a first pivot pin being connected to the pair of footings adjacent base segments thereof;
a second pivot pin being connected to the pair of footings at ends of the pair of footings remote from the base segments, ends of the pair of angle arms being connected to the second pivot pin such that the pair of angle arms are rotatable with respect to the pair of footings about a rotational axis defined by the second pivot pin;
a third pivot pin being connected to the pair of angle arms at a position that is offset from the second pivot pin;
an actuator having one end coupled to the first pivot pin and another end coupled to the third pivot pin, the actuator being actuatable such that the pair or angle arms pivot with respect to the pair of footings about the rotational axis defined by the second pivot pin between a retracted condition and an extended condition;
in the retracted position of the actuator, a distance between the third pivot pin and the first pivot pin is at a minimum and the at least one load cell and the at least one feed trough are arranged in the set feed position, and
in the extended condition of the actuator, the distance between the third pivot pin and the first pivot pin is at a maximum and the at least one load cell and the at least one feed trough are arranged in the pivoted discharge position.

6. A feeding system for measuring, monitoring and managing feed intake to determine feed efficiency of individual animals of a dairy herd, the feeding system comprising:

a plurality of feed troughs, each of the feed troughs containing feed to be consumed by the individual animals of the dairy herd, each of the plurality of feed troughs comprising a front panel having an opening through which the individual animals located in feeding positions can access and consume the feed contained within the respective feed trough, each of the plurality feed troughs further comprising a back panel that is angled away from the front panel;

the plurality of feed troughs being arranged such that the front panels of the plurality of feed troughs are adjacent a plurality of gates to retain the individual animals in the feeding position with respect to the plurality of feed troughs, each of the plurality of gates enabling only one of the individual animals to feed from a corresponding one of the plurality of feed troughs at a time;

each of the plurality of feed troughs being supported on a pair of load cells which detect a weight of the feed contained within the plurality of feed troughs, respectively, the pairs of load cells communicating with a control station which receives weight data transmitted from the pairs of load cells;

the pairs of load cells and the plurality of feed troughs being supported on a plurality of base frame members which are coupled to a plurality of lifting assemblies, each of the plurality of lifting assemblies comprising a fixed member, a pivotable member having a first end that is pivotably coupled to the fixed member and an actuator having one end connected to the fixed member and another end connected to the pivotable member; and a second end of the pivotable members of the plurality of lifting assemblies are fixed to the plurality of base frame members, respectively, and the actuators of the plurality of lifting assemblies are actuatable to pivot the pivotable members of the plurality of lifting assemblies to lift the plurality of feed troughs from a set feeding position, in which the individual animals can access and consume the feed contained within the plurality of feed troughs, to a pivoted discharge position in which remaining feed within the plurality of feed troughs is discharged along the back panel from the feed trough.

* * * * *

UNITED STATES PATENT AND TRADEMARK OFFICE
CERTIFICATE OF CORRECTION

PATENT NO. : 11,457,613 B2
APPLICATION NO. : 16/650563
DATED : October 4, 2022
INVENTOR(S) : Camiel Huisma It is certified that error appears in the above-identified patent and that said Letters Patent is hereby corrected as shown below:

On the Title Page

In the Title, at (54), Line 4 and in the Specification, Column 1, Line 4:
DELETE: "DIARY"
INSERT: --DAIRY--

Signed and Sealed this
Twentieth Day of December, 2022

Katherine Kelly Vidal
*Director of the United States Patent and Trademark Office*